Feb. 16, 1932. J. W. WILDERMUTH 1,845,642
LIP TILE AND SUPPORT THEREFOR
Filed Feb. 4, 1929  2 Sheets-Sheet 1
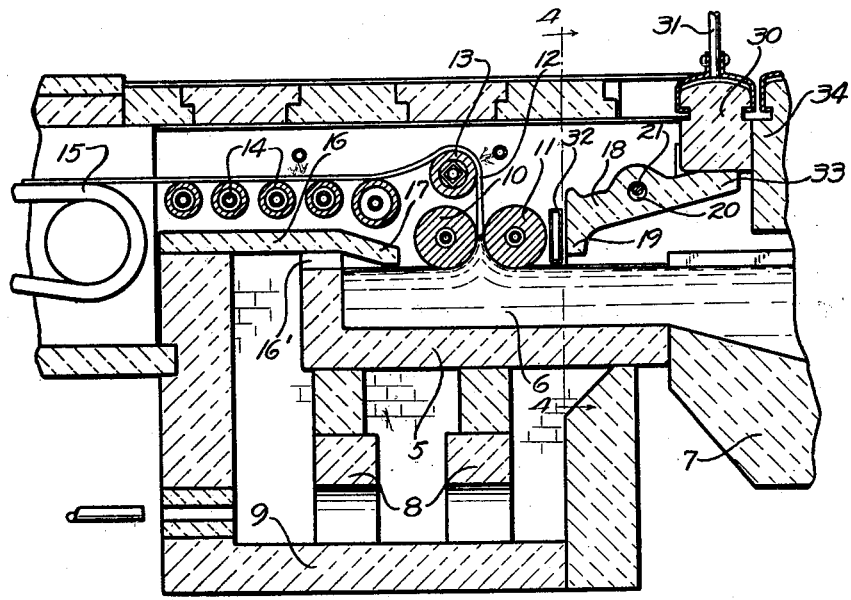
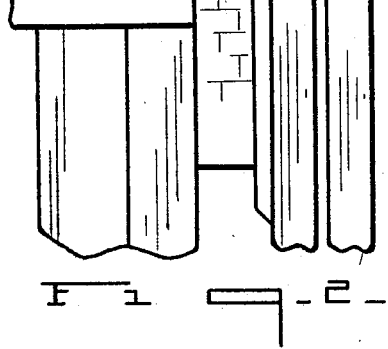
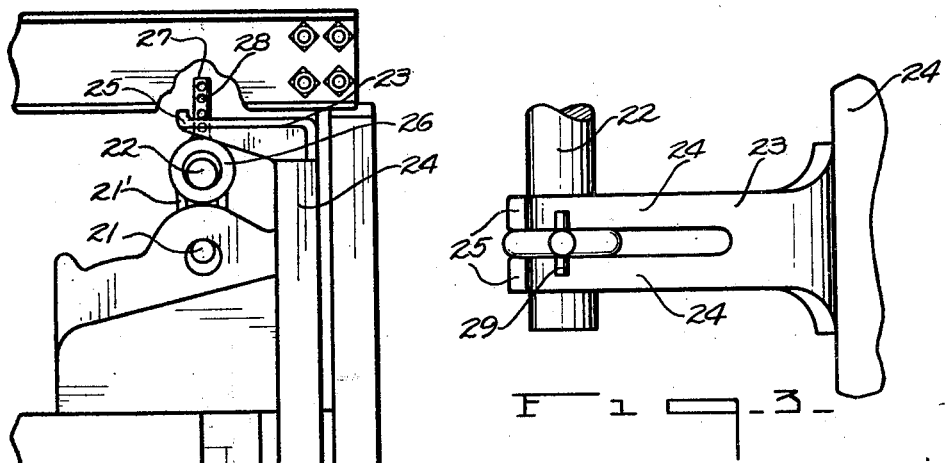
Inventor
Jesse W. Wildermuth
By Frank Fraser,
Attorney

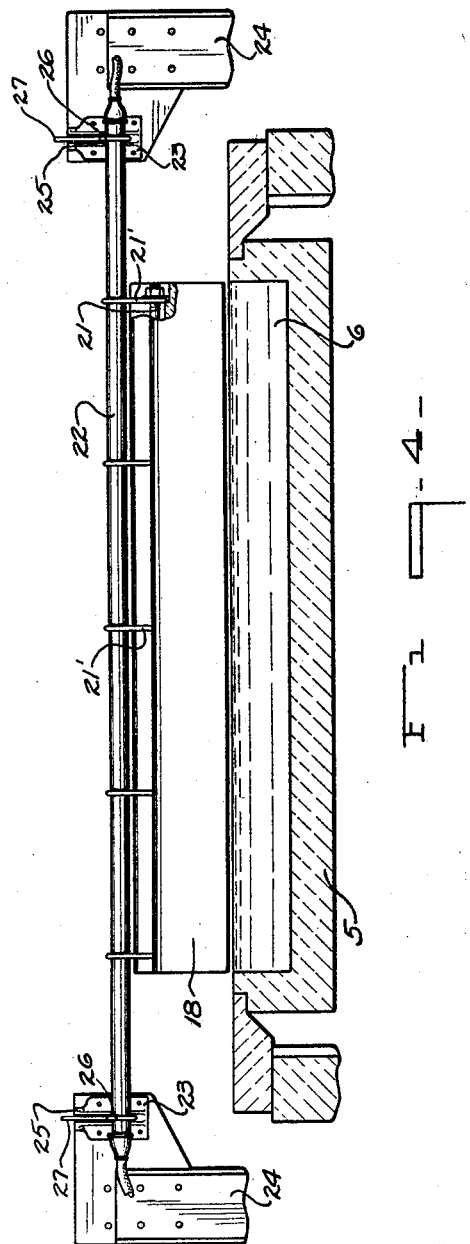

Patented Feb. 16, 1932

1,845,642

UNITED STATES PATENT OFFICE

JESSE W. WILDERMUTH, OF LANCASTER, OHIO, ASSIGNOR TO LIBBEY-OWENS-FORD GLASS COMPANY, OF TOLEDO, OHIO, A CORPORATION OF OHIO

LIP-TILE AND SUPPORT THEREFOR

Application filed February 4, 1929. Serial No. 337,220.

The present invention relates to glass apparatus and particularly to a lip-tile and support therefor.

An important object of the invention is to provide in glass apparatus, a lip-tile that may be adjusted horizontally and vertically with respect to the mass of molten glass from which the commercial article is produced.

Another object of the invention is to provide such an apparatus wherein a lip-tile is pivotally supported above a mass of molten glass, the pivotal support for said tile being adjustable vertically, and means being provided for contact with one end of said tile to control the position of the opposite end with respect to the surface of the molten glass.

Other objects and advantages of the invention will become more apparent during the course of the following description when taken in connection with the accompanying drawings.

In the drawings wherein like numerals are employed to designate like parts throughout the same, Fig. 1 is a fragmentary vertical longitudinal section through a form of sheet glass apparatus illustrating my invention in use, Fig. 2 is an enlarged fragmentary side elevation thereof, Fig. 3 is an enlarged detail thereof, and Fig. 4 is a vertical transverse section taken substantially on line 4—4 of Fig. 1.

Referring to the drawings, the numeral 5 designates a working receptacle adapted to contain a mass of molten glass 6 which may be continuously furnished from a furnace 7. The receptacle 5 is preferably supported on a series of stools 8 contained in a proper heat controlled compartment 9.

As illustrated, there is arranged over the mass of molten glass 6, a pair of sheet forming rolls 10 and 11 respectively, designed to be so mounted that they create a sheet forming pass therebetween through which the mass of glass 6 may be moved and rolled to a sheet 12 having substantially a predetermined and uniform thickness. The sheet 12 may be carried vertically from the sheet forming pass and then deflected over a roll 13 so that the sheet may be conveyed over a series of rolls 14 and to a flattening table 15. It is to be clearly understood, however, that the present invention is in no way limited to any particular type of sheet forming means, the type illustrated being made by way of example only.

At the closed end of the receptacle 5 is preferably arranged a substantially flat tile 16, being supported at one end on the upstanding wall of the compartment 9 and being supported near its opposite end by a series of spaced bricks or similar construction 16. The tile may be bent downwardly as at 17 to position this end of the tile relatively close to the surface of the molten glass 6. In this manner, heated air coming from the compartment 9 may be directed upon the surface of the glass near the closed end of the pot 5, thus preventing undue chilling thereof with subsequent devitrification.

The present invention relates particularly to the means of supporting the tile 18 which is arranged on the opposite sides of the rolls 10 and 11 from the tile 16. As above stated, the glass 6 may be supplied from a continuous tank furnace 7, and due to this connection between the receptacle 5 and the furnace, a certain amount of heated air and gas has a tendency to move from the furnace toward the sheet 12. The tile 18 is provided to protect not only the sheet 12 but also the forming rolls 10 and 11 from these gases. It has been found in actual practice that it is preferable to provide adjustments for the tile 18 as conditions vary making it, from a practical standpoint, impossible to determine beforehand the exact location that is best for the tile.

The tile 18 is provided at one end with the lip 19 designed normally to be relatively close to the surface of the molten glass 6. Extending through a transversely disposed opening 20 in the tile 18 is a rod 21. The tile may be cut out at spaced intervals to permit the hanging of link members 21' upon the rod 21, the link members in turn surrounding a second bar 22 shown clearly in Figs. 2 and 3.

In Figs. 2 and 3 is illustrated a bracket member 23 carried by the upright structure 24. It is preferred that a bracket member be arranged at each side of the machine as shown in Fig. 4, the bracket member being bifurcated at one end as shown in Fig. 3, thus providing the spaced arms 24 terminating in the upwardly extending projections 25. The opposite end of the bracket may be supported upon the structure 24 by means of a welded joint or bolt members. A pair of eye-bolts 26, having the upwardly extending shanks 27, are adapted to support the cross bar 22, while the shanks of the eye-bolts are of such size that they may be positioned between the arms 24 of the bracket. Transverse openings 28 are formed through the shank of the eye-bolts through which openings may extend a pin 29 adapted to be received upon the top of the arms 24.

The opposite end of the tile 18 is adapted to bear against an adjustable jack-arch member 30 illustrated as being supported by means of rods 31. It will thus be seen that the tile 18 is pivotally supported upon the bar or cross rod 20 so that upon vertical movement of the jack-arch member 30, the end 19 of the tile will be moved to and from the surface of the molten glass 6 depending upon the movement of the jack-arch. A temperature controlled shield 32 may be positioned between the lip-tile and the roll 11.

In operation, the position of the lip 19 of the tile 18 may be made approximately correct with respect to the surface of the molten glass by adjustment of the eye-bolts vertically. Minute adjustments may then be made by controlling the position of the jack-arch 30. This will control the vertical position of the lip 19. Due to the length of the gap between the arms 24, it will be seen that the eye-bolts can be moved horizontally with respect to the draw-pot 5. It will also be noted that the end 33 of the tile 18 is in spaced relation to the refractory member 34, thus permitting horizontal movement of the tile without conflict between it and the member 34. Therefore, the lip 19 of the tile can be adjusted with respect to the roll 11 and also the surface of the molten glass 6.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, the combination with a receptacle containing a mass of molten glass, and means for forming a sheet therefrom, bracket members arranged above the mass of molten glass, each bracket member having a pair of substantially parallel arms extending therefrom, an eye-bolt for each bracket, each eye-bolt having its shank extending between the parallel arms, said shanks each having a plurality of openings therethrough, means extending through said openings and adapted to rest upon the arms whereby to support the eye-bolts, and a lip-tile supported by said eye-bolts.

2. In sheet glass apparatus, the combination with a receptacle containing a mass of molten glass, and means for forming a sheet therefrom, bracket members arranged above the mass of molten glass, each bracket member having a pair of substantially parallel arms extending therefrom, an eye-bolt for each bracket, each eye-bolt having its shank extending between the parallel arms, said shanks each having a plurality of openings therethrough, means extending through said openings and adapted to rest upon the arms whereby to support the eye-bolts, and a lip-tile pivotally supported by said eye-bolts.

3. In sheet glass apparatus, the combination with a receptacle containing a mass of molten glass, and means for forming a sheet therefrom, bracket members arranged above the mass of molten glass, each bracket member having a pair of substantially parallel arms extending therefrom, an eye-bolt for each bracket, each eye-bolt having its shank extending between the parallel arms, said shanks each having a plurality of openings therethrough, means extending through said openings and adapted to rest upon the arms whereby to support the eye-bolts, and a lip-tile pivotally supported by said eye-bolts, said eye-bolts being adjustable vertically and horizontally with respect to the brackets whereby to effect both vertical and horizontal adjustment of the tile.

4. In sheet glass apparatus, the combination with a receptacle containing a mass of molten glass, and means for forming a sheet therefrom, of a lip tile arranged at one side of the sheet above the molten glass, means for pivotally mounting the tip tile, and a vertically adjustable jack-arch positioned above one end of the lip tile to engage said lip tile for rocking the same about its pivotal support.

5. In sheet glass apparatus, the combination with a receptacle containing a mass of molten glass, and means for forming a sheet therefrom, of a lip tile arranged at one side of the sheet above the molten glass, a pivotal mounting therefor, means for moving the lip tile to effect vertical adjustment thereof with respect to the mass of molten glass, and a vertically adjustable jack-arch positioned above one end of the lip tile and engaging said lip tile for rocking the same about its pivotal support.

6. In sheet glass apparatus, the combination with a receptacle containing a mass of molten glass, and means for forming a sheet therefrom, of a lip tile arranged at one side of the sheet above the molten glass, means for pivotally mounting the lip tile, and a vertically adjustable jack-arch positioned above one end of the lip tile and engaging said lip tile for rocking the same about its pivotal support, said pivotal mounting being adjustable horizontally above the mass of molten glass from which the sheet is formed.

7. In sheet glass apparatus, the combination with a receptacle containing a mass of molten glass, and means for forming a sheet therefrom, of a lip tile arranged at one side of the sheet above the molten glass, means for pivotally mounting the lip tile so that its heaviest portion will be on the side adjacent the sheet, means for moving the lip tile to effect vertical adjustment thereof with respect to the mass of molten glass, and a vertically adjustable jack-arch positioned above the end of the lip tile remote from the sheet and engaging the same for rocking said lip tile about its pivotal support.

Signed at Lancaster, in the county of Fairfield and State of Ohio, this 21st day of January, 1929.

JESSE W. WILDERMUTH.